US009263960B2

(12) United States Patent
Jovanović et al.

(10) Patent No.: US 9,263,960 B2
(45) Date of Patent: Feb. 16, 2016

(54) POWER CONVERTERS FOR WIDE INPUT OR OUTPUT VOLTAGE RANGE AND CONTROL METHODS THEREOF

(71) Applicant: Delta Electronics, Inc., Neihu (TW)

(72) Inventors: Milan M. Jovanović, Cary, NC (US); Brian T. Irving, Hillsborough, NC (US)

(73) Assignee: Delta Electronics, Inc., Neihu (TW)

( * ) Notice: Subject to any disclaimer, the term of this patent is extended or adjusted under 35 U.S.C. 154(b) by 246 days.

(21) Appl. No.: 14/027,473

(22) Filed: Sep. 16, 2013

(65) Prior Publication Data

US 2015/0078036 A1    Mar. 19, 2015

(51) Int. Cl.
*H02M 3/335* (2006.01)
*H02M 3/337* (2006.01)
*H02M 1/10* (2006.01)
*H02M 1/00* (2007.01)

(52) U.S. Cl.
CPC ............... *H02M 3/337* (2013.01); *H02M 1/10* (2013.01); *H02M 2001/0058* (2013.01)

(58) Field of Classification Search
CPC ................................................ H02M 3/33507
See application file for complete search history.

(56) References Cited

U.S. PATENT DOCUMENTS

| | | | |
|---|---|---|---|
| 5,959,857 A | 9/1999 | Nagahara | |
| 6,804,129 B2 * | 10/2004 | Lin | 363/98 |
| 7,652,899 B2 * | 1/2010 | Mozipo et al. | 363/98 |
| 8,780,585 B2 * | 7/2014 | Ye | 363/17 |
| 9,001,539 B2 * | 4/2015 | Oh | 363/89 |
| 2002/0001203 A1 * | 1/2002 | Jitaru | 363/17 |
| 2005/0174818 A1 * | 8/2005 | Lin et al. | 363/98 |
| 2006/0022650 A1 * | 2/2006 | Vinciarelli | 323/266 |
| 2009/0244934 A1 * | 10/2009 | Wang et al. | 363/21.06 |
| 2009/0303750 A1 * | 12/2009 | Zhu et al. | 363/13 |
| 2010/0157635 A1 * | 6/2010 | Bagarelli et al. | 363/123 |
| 2011/0038180 A1 | 2/2011 | Yang | |
| 2011/0103097 A1 * | 5/2011 | Wang et al. | 363/17 |
| 2011/0292688 A1 * | 12/2011 | Zhang et al. | 363/21.02 |
| 2013/0044529 A1 * | 2/2013 | Proca et al. | 363/132 |

(Continued)

OTHER PUBLICATIONS

Z. Liang, R. Guo, G. Wang, and A. Huang, "A New Wide Input Range High Efficiency Photovoltaic Inverter", Proc. IEEE Energy Conversion Congess and Expo (ECCE), 2010, pp. 2937-2943.

(Continued)

*Primary Examiner* — Emily P Pham
(74) *Attorney, Agent, or Firm* — Edward C. Kwok; Hogan Lovells US LLP

(57) ABSTRACT

A power converter topology is adapted for efficiency according to input voltage, output voltage or output current conditions. Topology adaptation is achieved by control responsive to the input and output operating conditions, or to one or more external control signals. Transition between any two topologies is implemented by pulse width modulation in the two switches in one of two bridge legs of a full bridge converter. When transitioning from full-bridge to half-bridge topology, the duty ratio of one switch in one leg of the full bridge is increased, while simultaneously the duty ratio of the other switch in the same leg is reduced until one switch is continuously on, while the other switch is continuously off. The transition from the half-bridge to the full-bridge topology is accomplished by modulating the same switches such that, at the end of the transition, both switches operate with substantially the same duty cycle.

19 Claims, 6 Drawing Sheets

(56) References Cited

U.S. PATENT DOCUMENTS

2013/0257311 A1* 10/2013 Tran et al. ............ 315/279
2014/0177281 A1* 6/2014 Lai et al. ............ 363/17

OTHER PUBLICATIONS

H. Hu, X. Fang, Q. Zhang, Z.J. Shen, I. Batarseh, "Optimal Design Considerations for a Modified LLC Converter With Wide Input Voltage Range Capability Suitable for PV Applications", Proc. IEEE Energy Conversion Congress and Expo (ECCE), 2011, pp. 3096-3103.

H. Hu, X. Fang, F. Chen, Z.J. Shen, I. Batarseh, "A Modified High-Efficiency LLC Converter With Two Transformers for Wide Input-Voltage Range Applications", IEEE Transactions on Power Electronics, vol. 28, No. 4, pp. 1946-1960, Apr. 2013.

* cited by examiner (a)

(b)

(a)

(b)

(a)

(b)

POWER CONVERTERS FOR WIDE INPUT OR OUTPUT VOLTAGE RANGE AND CONTROL METHODS THEREOF

BACKGROUND OF THE INVENTION

1. Field of the Invention

The present invention relates to power converters that can efficiently operate with a wide input-voltage or output-voltage range.

2. Description of the Related Art

In many applications, power conversion circuits are required to operate with a wide input or output voltage range. For example, most single-phase AC/DC power supplies in today's computer and telecommunication ("telecom") power systems must operate in the universal AC line range between 90 $V_{RMS}$ and 264 $V_{RMS}$ and must provide a regulated output voltage. Typically, telecom AC/DC power supplies provide a regulated output voltage between 42 V to 58 V, while power supplies for desktop, networking, and server applications provide a single constant output voltage or multiple constant output voltages. However, to further improve energy efficiency, an emerging requirement in server power supplies is a single output voltage selectable from two predetermined levels. Specifically, this new generation of server power supplies with dynamically adjustable output voltage provides a 12V output at full and mid-range loads, and a 6V output at light loads (for light-load efficiency). AC/DC battery chargers are another major class of power converters that operate with a wide input or output voltage range. For example, today's plug-in and battery electric vehicles (EVs) have an output voltage range of 200-450 volts.

There is a trade-off between the input voltage range or the output voltage range and conversion efficiency. Power converters operating in a wide input voltage range or output voltage range exhibit a larger efficiency fall-off than their narrow-range counterparts.

The detrimental effect of a wide input or output voltage range on conversion efficiency is more severe in resonant converters than in pulse-width-modulated (PWM) converters. Generally, resonant converters regulate output voltage by changing switching frequencies. Specifically, in resonant converters designed to provide zero-voltage-switching (ZVS), the switching frequency is increased to maintain output regulation when the input voltage increases or when the output voltage decreases. As a result, these converters suffer from increased switching losses when they operate away from the minimum input voltage or the maximum output voltage. Therefore, resonant converters—including the most efficient series-resonant LLC converter topology—are not suitable for applications with a wide output voltage range. PWM converters that operate at a constant frequency do not suffer from increased switching losses in wide input voltage or wide output voltage applications. Thus, any efficiency drop associated with an output voltage decrease for such converters is primarily due to other factors (e.g., an increased conduction loss resulting from a reduced duty cycle, which increases the RMS current).

The overall efficiency in converters operating in an extremely wide input or output voltage range can be improved by multi-stage conversion. Specifically, a pre-regulator stage can be used to handle wide input voltage variations, and a post-regulator stage can be used to handle the wide output-voltage range. While this approach has been demonstrated to improve efficiency, as compared to a single-stage conversion, it is not preferred as the increased number of components increases circuit complexity and cost.

SUMMARY

According to one embodiment of the present invention, a method improves efficiency in power converters operating with a wide input or output voltage range by topology morphing (i.e., changing the power converter's topology). Generally, in a method of the present invention, the power converter topology is adapted to that which is optimized for a given input or output voltage condition. The topology adapts to a control signal that is responsive to input or output operating conditions, or to an external control signal.

In one embodiment of the present invention, an LLC full-bridge converter morphs into a half-bridge LLC converter and vice versa. The full-bridge topology is used when the ratio of the input voltage to the output voltage is in a low range, i.e., when the input voltage is low or when the output voltage is high. Alternatively, the topology is changed to a half-bridge configuration when the input to output voltage ratio is in the high range, i.e., when the input voltage is high or the output voltage is low. The transition between the two topologies is implemented using pulse-width-modulation (PWM) of the two switches in one of the bridge legs. Specifically, when transitioning from the full-bridge topology to the half-bridge topology, the duty ratio of one switch is increased from 50% to 100%, while the duty ratio of the other switch is simultaneously reduced from 50% to 0%, so that after the transition one switch is continuously kept on while the other is continuously kept off. The transition from the half-bridge to the full-bridge topology is accomplished by beginning modulation in the non-switching leg and changing the duty ratios of the switches until both operate at a 50% duty ratio.

The same morphing technique is applicable to any full-bridge topology. For example, a PWM or phase-shift ZVS full-bridge converter can be morphed into a PWM half-bridge converter, or a two-switch forward or forward-flyback topology.

The methods of the present invention increase conversion efficiency in a single-stage converter that operates in a wide input or output voltage range, without requiring additional components.

The present invention is better understood upon consideration of the detailed description below, in conjunction with the accompanying drawings.

DETAILED DESCRIPTION OF THE PREFERRED EMBODIMENTS

Figure 1:
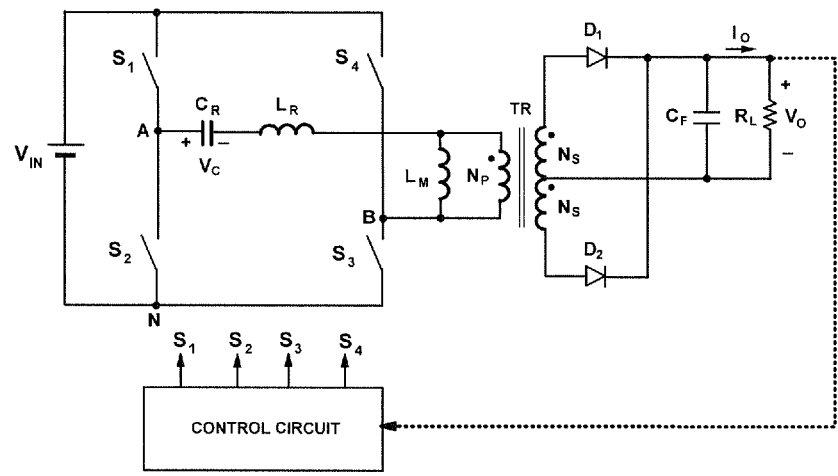
FIGS. 1(a) and 1(b) show a simplified circuit for a conventional full-bridge LLC converter, and the timing diagrams for its switches $S_1$ to $S_4$, respectively.
Figure 1:
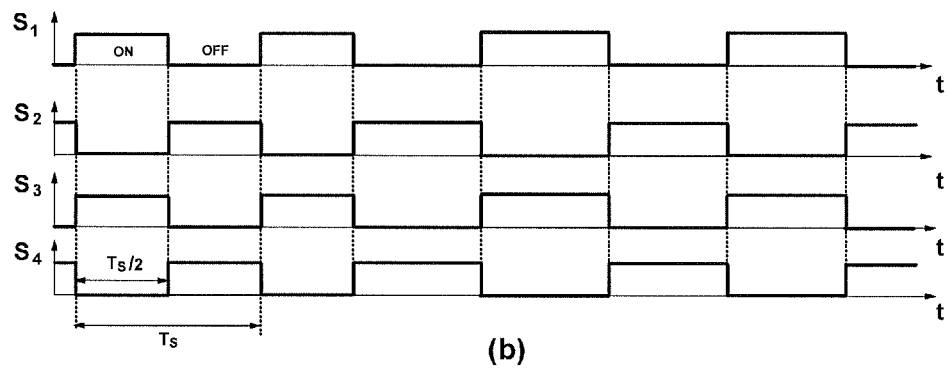
Figure 2:
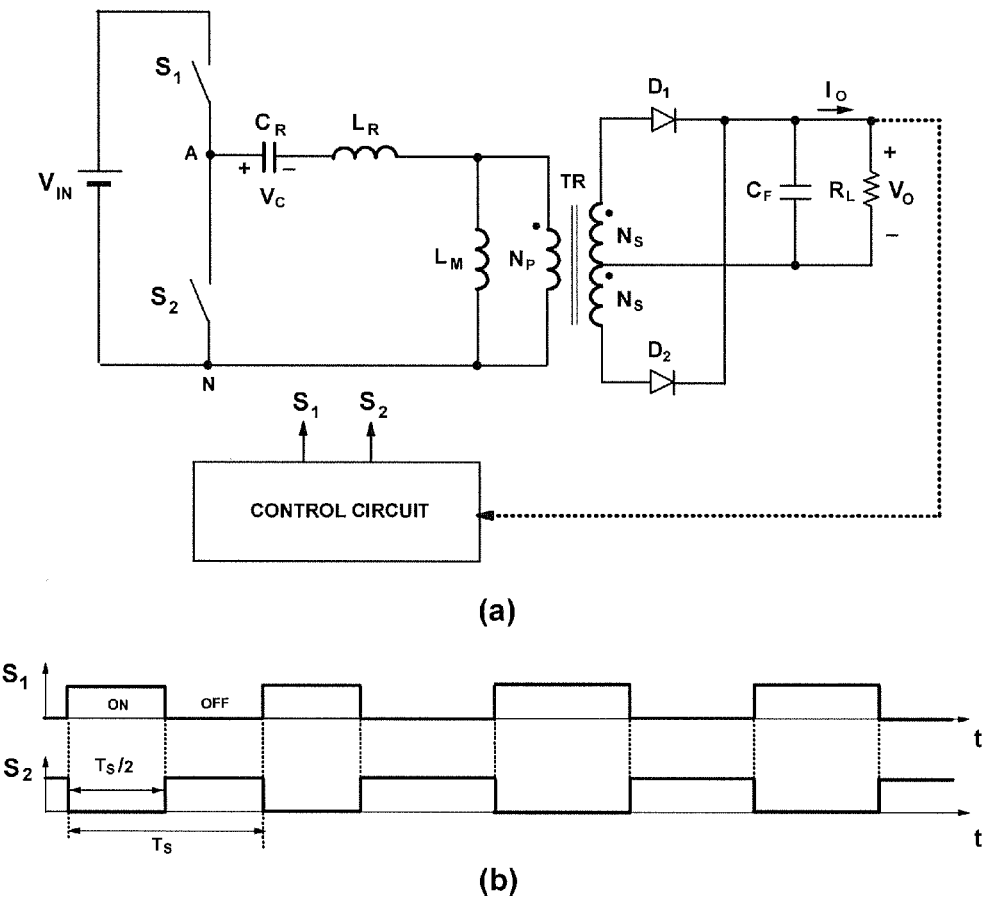
FIGS. 2(a) and 2(b) show a simplified circuit for a conventional half-bridge LLC converter and the timing diagrams of its switches $S_1$ and $S_2$, respectively.

FIGS. 1(a) and 2(a) show simplified circuits or models of conventional full-bridge (FB) and half-bridge (HB) LLC resonant converters, respectively. FIGS. 1(b) and 2(b) are the corresponding timing diagrams for the principal switches of the FB and HB LLC resonant converters, respectively. Both the circuits of FIGS. 1(a) and 2(a) use conventional variable switching-frequency control to regulate the output voltage. In the FB LLC converter shown in FIG. 1(a), control is achieved by simultaneously switching the $S_1$ and $S_3$ switch pair and $S_2$ and $S_4$ switch pair in a complementary fashion, with each switch operating at a 50% duty ratio, as illustrated in FIG. 1(b). Similarly, in the HB LLC converter of FIG. 2(a), the variable switching-frequency control is achieved by switching switches $S_1$ and $S_2$ in a complementary fashion, with each switch operating at a 50% duty ratio, as illustrated in FIG. 2(b). The switching frequency for each LLC converter is a function of input voltage $V_{IN}$, output voltage $V_O$, and output current $I_O$. Generally, the switching frequency increases with both increases in the input voltage, and decreases in the output voltage and the output current.

The HB and FB LLC converters of FIGS. 1(a) and 2(a) are also extensively used to implement DC/DC transformers (i.e., isolated power converters that operate without a regulation loop and whose output voltage is proportional to the input voltage). When implemented as DC/DC transformers, these HB and FB LLC converters operate at a constant frequency (e.g., in each converter, near the resonant frequency of $C_R$ and $L_R$), with each switch also operating at 50% duty ratio.

In the FB LLC converter of FIG. 1(a), due to the complementary actions in switch pairs $S_1$ and $S_3$ and $S_2$ and $S_4$, operating at a 50% duty ratio, a bipolar square-wave voltage $V_{AB}$—i.e., a square wave having both positive and negative segments—is applied across the terminals of the series-connected $L_R$-$L_M$-$C_R$ resonant circuit. In the $L_R$-$L_M$-$C_R$ resonant circuit, the average (i.e., DC) voltage of resonant capacitor $V_{CR(AVG)}$ is zero. In contrast, in the HB LLC circuit of FIG. 2(a), the voltage $V_{AN}$ applied across the terminals of the resonant circuit is a positive square wave voltage with a 50% duty ratio and amplitude $V_{IN}$. Thus, the average or DC voltage of resonant capacitor $C_R$ is $V_{CR(AVG)}=V_{IN}/2$. As can be surmised from FIGS. 1(b) and 2(b), the FB LLC converter of FIG. 1(a) receives the entire input voltage $V_{IN}$ across the terminals of series-connected $L_R$-$L_M$-$C_R$ resonant circuit, while only one half of the input voltage $V_{IN}$ (i.e., $V_{IN}-V_{CR(AVG)}=V_{IN}-V_{IN}/2=V_{IN}/2$) is applied to the $L_R$-$L_M$-$C_R$ resonant circuit of the HB converter of FIG. 2(a). Therefore, for a given turns ratio in transformer TR, the DC voltage gain (i.e., $M_{FB}=V_O/V_{IN}$) of the FB converter of FIG. 1(a) is twice the DC voltage gain of the HB converter of FIG. 2(a) (i.e., $M_{HB}=V_O/(V_{IN}/2)=M_{FB}/2$).

Switches $S_1$-$S_4$ of the circuits of FIGS. 1(a) and 2(a) block voltage in one direction and conduct current in both directions. Typically, switches $S_1$-$S_4$ are each implemented by a MOSFET, which structure includes an anti-parallel body diode that allows bidirectional current flow. Also, secondary-side diode rectifiers $D_1$ and $D_2$ in each of the circuits of FIGS. 1(a) and 2(a) may implemented by synchronous rectifiers (SRs) to reduce rectification losses and to improve efficiency. In practical implementations, a small dead time is provided between the commutation instants of the same-leg switches $S_1$ & $S_2$ and $S_3$ & $S_4$ to achieve zero-voltage-switching (ZVS) in the turning-on switch. Because of this dead time, the duty ratio of the switches is not exactly 50% as shown in idealized timing diagrams in FIGS. 1(b) and 2(b), but slightly less than 50%.

Resonant converters, such as the LLC resonant converters of FIGS. 1(a) and 2(a), exhibit maximum efficiency when operated near the resonant frequency. As a result, a resonant converter is designed to operate at the resonant frequency which maximizes efficiency under the operating conditions. Specifically, such an LLC resonant converter exhibits maximum efficiency when operated close to resonant frequency $\omega_O=1/\sqrt{L_R C_R}$ of the series-resonant circuit formed by resonant inductor $L_R$ and resonant capacitor $C_R$ (i.e., when the on-time of the switches is close to $T_{ON}=T_O/2=\pi/\omega_O$, where $T_O$ is the resonant period). Because efficiency decreases when the operating point of an LLC resonant converter moves away from its resonant frequency, such as due to variations in load current, input voltage, or output voltage, the LLC resonant converter is not suitable for an application which requires a very wide input or output voltage range.

The efficiency of an LLC converter operating in a very wide input or output voltage range can be improved by recognizing that, for the same turns-ratio of the transformer $N_P/N_S$ and the same values in resonant-tank components $L_S$, $C_S$, and $L_M$, the DC voltage gain of the FB LLC topology is twice that of the HB LLC topology. Consequently, the FB LLC topology is more suitable for a higher DC voltage gain application, while the HB LLC topology is more suitable for a lower DC voltage gain application. Since the HB LLC topology can be obtained from the FB LLC topology by not switching one leg of the FB LLC converter (i.e., by permanently keeping one switch in the non-switching leg on and the other switch of the same leg off), optimized performance can be obtained by a proper control in an LLC converter operating in a very wide input or output voltage range.

In its simplest form, a controller that allows transitioning between operating as a FB resonant converter and operating as a HB LLC resonant converter, and vice versa, may be implemented so that switching is interrupted briefly to transition between the switching patterns of these converters. Because no power is transferred between the input and output terminals during a transition, under this approach the output variable (usually an output voltage or a current) dips (i.e., during a transition, the value of the output variable decreases below the steady-state value). Under this approach, to reduce the dip and to keep the output variable to within its specified range-during a topology transitions, energy storage may be increased in an output filter.

According to one embodiment of the present invention, a method provides a topology transition without interruption of switching (i.e., during a transition, all switches remain modulated), while maintaining the output variable within the specified limits without having to increase storage capacity in the output filter.

Figure 3:
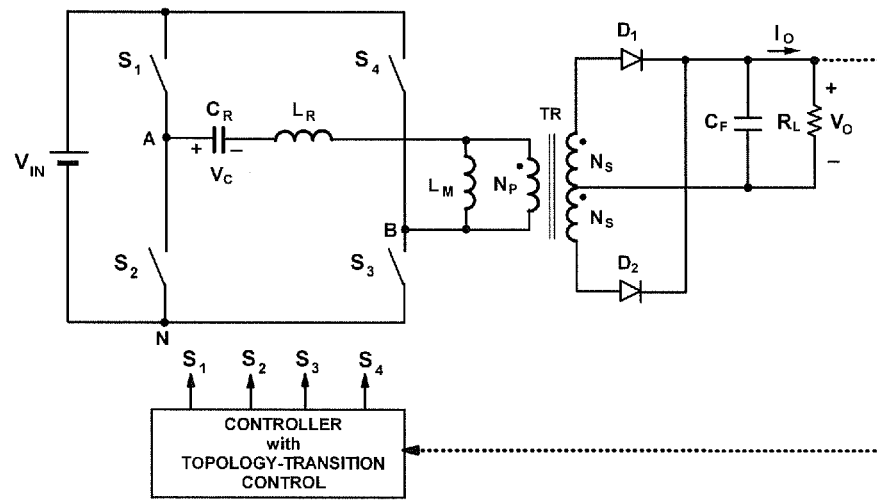
FIGS. 3(a), 3(b) and 3(c) show a simplified circuit diagram of a FB LLC resonant converter with topology-transition control, the timing diagrams of switches $S_1$ to $S_4$ during a full-bridge to half-bridge topology transition, and the timing diagrams of switches $S_1$ to $S_4$ during a half-bridge to full-bridge topology transition, respectively, in accordance with one embodiment of the present invention.
Figure 3:
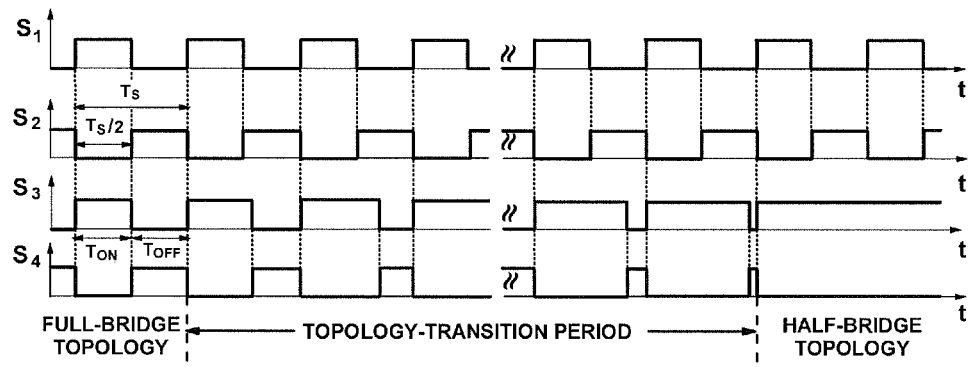
Figure 3:
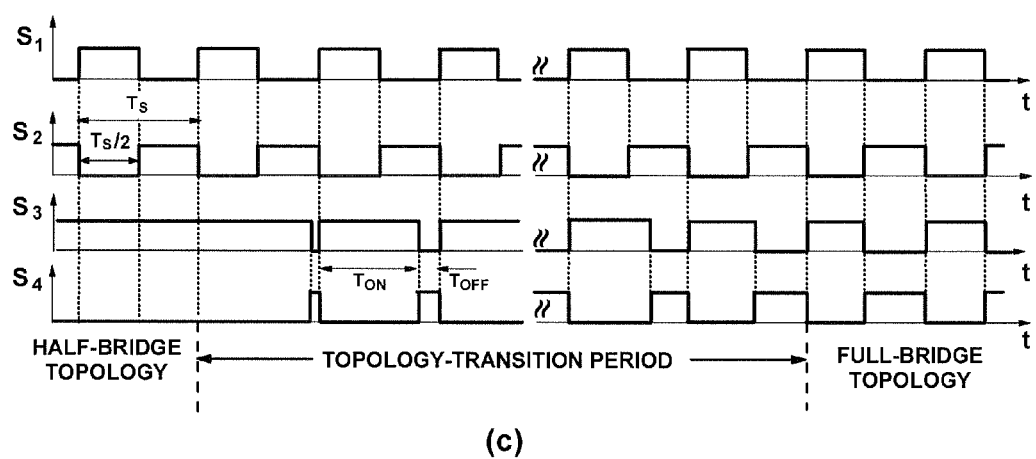

FIGS. 3(a), 3(b) and 3(c) illustrate a method that provides transitions between FB and HB LLC resonant converter topologies without interruption of switching, according to one embodiment of the present invention. FIG. 3(a) shows a FB LLC converter that may be operated either as a FB or as a HB LLC resonant converter, depending on the input and output operating conditions. In the circuit of FIG. 3(a), transitions between the two topologies for the circuit of FIG. 3(a) are accomplished by PWM control of the two switches in one of the legs of the full bridge. For example, FIG. 3(b) illustrates switching signals for switches $S_3$ and $S_4$ during a transition from the FB topology to the HB topology. During operation as a FB LLC resonant converter, switches $S_1$ to $S_4$ are operated with variable switching frequency and a 50% duty ratio.

During a transition, switches $S_1$ and $S_2$ continue to operate with the variable switching frequency and the 50% duty ratio to maintain the output value at the desired level, while PWM modulation increases the duty ratio of switch $S_3$ monotonically from 50% to 100% and reduces the duty ratio of switch $S_4$ from 50% to 0% in a complementary fashion. Because switch $S_3$ is permanently on and switch $S_4$ permanently off, the LLC resonant converter continues to operate as the HB converter during the transition period with variable-frequency control of switches $S_1$ and $S_2$. FIG. 3(c) illustrates switching signals for switches $S_3$ and $S_4$ during a transition from the HB topology to the FB topology. As shown in FIG. 3(c), switches $S_3$ and $S_4$ are modulated during the transition from HB to FB topology in substantially the opposite direction as the transition from the HB topology to the FB topology, i.e., the duty ratio of switch $S_3$ is decreased from 100% (i.e., continuously on) monotonously to 50% and, at the same time, the duty ratio of switch $S_4$ is increased from 0% (i.e., continuously off) in a complementary fashion.

The rate at which the duty-ratio changes in switches $S_3$ and $S_4$ during the topology transition period is determined by the time required for the average voltage $V_{CR(AVG)}$ on resonant capacitor $C_R$ to change between its value for the FB topology and its value for the HB topology. Specifically, for a transition from the FB topology to the HB topology, $V_{CR(AVG)}$ changes from zero to $V_{IN}/2$. Correspondingly, from the HB topology to the FB topology, $V_{CR(AVG)}$ changes from $V_{IN}/2$ to zero. If the topology transition time is too short or, in the worst case, abrupt, the voltage on resonant capacitor $C_R$ may not have sufficient time to be fully charged to the appropriate value before the topology transition completes. In such an event, a transient volt-second imbalance on the transformer may result in saturation in the transformer core, or an output voltage that is outside the desired range.

As shown in FIGS. 3(b) and (c), switches $S_1$ and $S_3$ are turned on at the same time during a topology transition period. However, other synchronization methods are possible. For example, switches $S_2$ and $S_4$ may be synchronized for turning on, switches $S_1$ and $S_3$ may be synchronized at the middle of on-time, or switches $S_2$ and $S_4$ may be synchronized at the middle of off-time.

Generally, topology transitions are responsive to input or output voltage changes or output current changes. As a result, to implement topology-transition control, the input voltage, the output voltage, or the output current needs to be sensed. A topology transition can be initiated by either a system controller (e.g., a power management controller) or, autonomously, by a power converter controller. While a controller with topology transition control may be implemented by both analog and digital circuitry, the digital approach is preferred because of adaptive control and complex timing requirements may be easily achieved.

Figure 4:
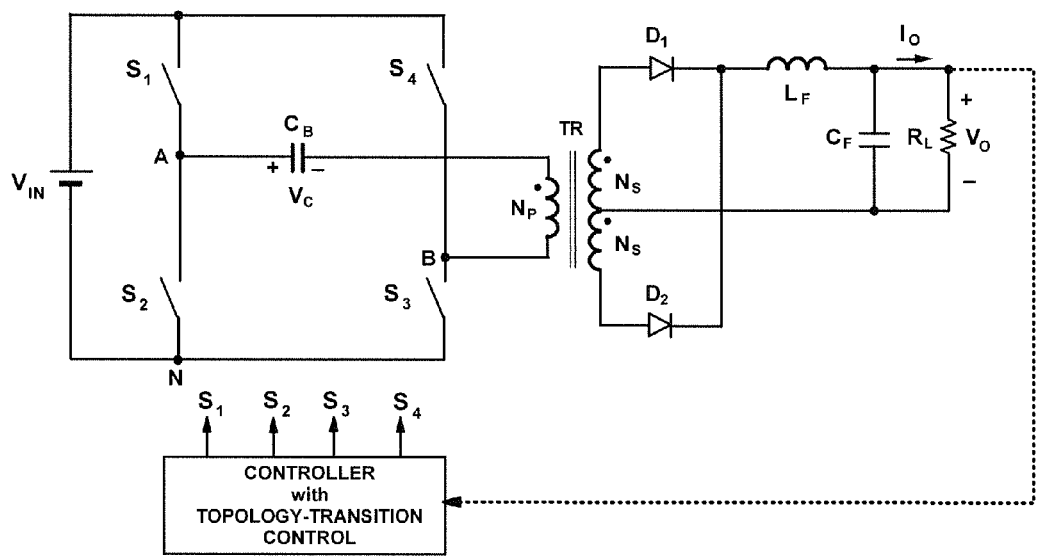
FIG. 4 shows a simplified circuit diagram representing either a PWM FB converter or a phase-shift ZVS FB converter, in which the leakage and magnetizing inductance of the transformer are not explicitly shown.

The topology-morphing methods of the present invention may be extended to other FB converters, including hard-switched, constant-frequency PWM FB converters, and constant-frequency ZVS FB converters with phase-shift control. FIG. 4 shows a simplified circuit diagram representing either a PWM FB converter or a phase-shift ZVS FB converter, in which the leakage and magnetizing inductance of the transformer are not explicitly shown. According to one embodiment of the present invention, capacitor $C_B$—which is connected in series with transformer TR—has a twofold purpose. First, capacitor $C_B$ blocks the DC-current flow through transformer TR and prevents transformer TR's saturation due to mismatched positive and negative volt-seconds across transformer TR's windings. In an ideal FB converter, the average voltage $V_{CB(AVG)}$ across blocking capacitor $C_B$ is zero. Second, capacitor $C_B$ splits the input voltage and provides a reset voltage to transformer TR, when the circuit operates as a HB converter. The average voltage $V_{CB(AVG)}$ in the HB topology is $V_{IN}/2$. When operating as a PWM FB converter, the leakage inductance is preferably minimized to reduce switching losses and ringing. When operating as a phase-shift ZVS FB converter, the leakage and sometimes the magnetizing inductance are intentionally increased to provide energy storage for an extended ZVS range. Often, when operating as a phase-shift ZVS FB converter, the leakage inductance is augmented by an external inductance in series with transformer TR and the associated clamping diodes.

Figure 5:
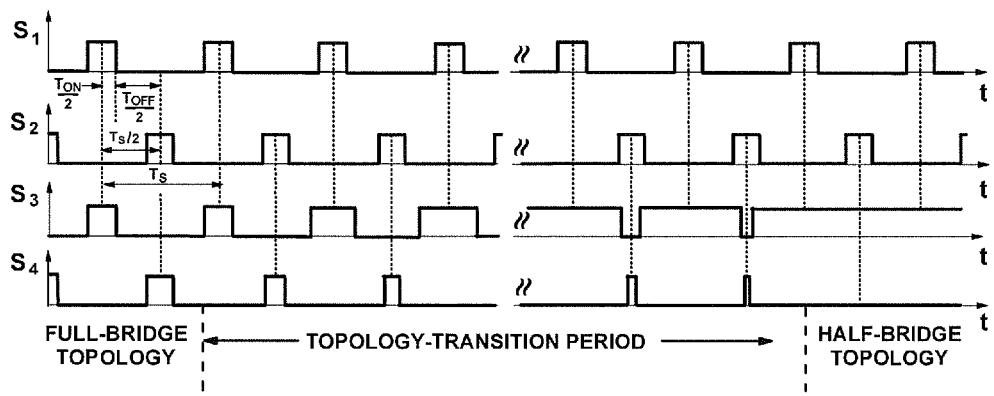
FIG. 5 shows the timing diagrams of a FB converter with topology-transition control: (a) PWM FB converter; (b) phase-shift ZVS FB converter.
Figure 5:
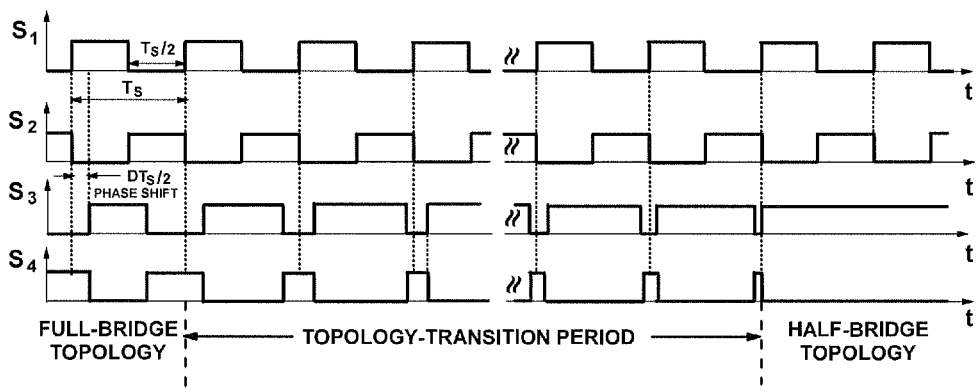

FIG. 5(a) shows exemplary timing diagrams for transitioning a PWM converter from the FB topology to the HB topology. In this implementation, when the circuit operates as a FB converter, diagonal switch pairs $S_1$ and $S_3$, and $S_2$ and $S_4$ are simultaneously turned on and off with the same duty ratio $D=T_{ON}/T_S$ and with $T_S/2$ interval between the corresponding switching instants for switch pair $S_1$ and $S_3$, and $S_2$ and $S_4$. During a topology transition, switches $S_1$ and $S_2$ continue to operate with the same duty ratio necessary to maintain the output at the desired level, while the duty ratio of switch $S_3$ is gradually increased and switch $S_4$ is gradually decreased. At the end of the transition period, switch $S_3$ is permanently on, while switch is permanently off, so that the circuit operates as a HB converter. Therefore, as shown in FIG. 5(a), the output regulation of this HB converter is achieved by duty-ratio modulation of switches $S_1$ and $S_2$. Other modulation schemes can also be used with the circuit in FIG. 4 operating as a HB converter. For example, constant-frequency asymmetrical duty-ratio modulation and variable-frequency constant-on or constant-off time are some of the options. In asymmetrical duty-ratio modulation, switches $S_1$ and $S_2$ are switched in a complementary fashion with a short dead time between their commutation instants (i.e., switches $S_1$ and $S_2$ are modulated at complementary duty ratios). The transition from the HB topology to the FB topology is implemented by reverse modulation substantially the same way as illustrated in FIGS. 3(b) and (c) for the LLC converter.

FIG. 5(a) shows exemplary timing diagrams for transitioning a constant-frequency, ZVS converter with phase shift control from the FB topology to the HB topology. As shown in FIG. 5(b), when the circuit operates as a FB converter with phase shift control, same leg switch pairs $S_1$ and $S_2$ and $S_3$ and $S_4$ are switched in a complementary fashion with a 50% duty ratio and the switching instants of the two legs are phase shifted by $DT_S/2$. During a topology transition, switches $S_1$ and $S_2$ continue to operate in a complementary fashion, i.e., with complementary duty-ratios that are necessary to maintain the output at the desired level, while the duty ratio of switch $S_3$ is gradually increased and switch $S_4$ is gradually decreased. As shown in FIG. 5(b), at the end of the transition period, switch $S_3$ is permanently on, while switch $S_4$ is permanently off, i.e., the circuit operates as a HB converter with asymmetrical duty-ratio modulation. Other modulation schemes during the transition period and during HB operation are also possible.

According to the embodiments of this invention, full transitions from a FB converter topology with identical duty cycles in both bridge legs to the corresponding HB converter topology (and vice versa) are not necessary. In some applications, it may be desirable to operate the converter only in the FB mode with identical duty cycles, or in either the HB mode or a mode where the duty cycles in the two bridge legs are different.

Other topology transitions can also be implemented according to the present invention. For example, a PWM or phase-shift full-bridge converter can also transition between a two-switch forward topology and a forward-flyback topology.

The above detailed description is provided to illustrate specific embodiments of the present invention and is not intended to be limiting. Numerous variations and modifications within the scope of the present invention are possible. The present invention is set forth in the accompanying claims.

We claim:

1. A power converter that receives a power source to power at least one load comprising:
    first and second pairs of serially-connected controllable switching devices coupled across the power source; and
    a controller that turns on and off the serially-connected controllable switching devices, the controller being configured to operate in first and second modulation modes, wherein in the first modulation mode, the serially-connected controllable switching devices in the first and second pairs are each operated at a substantially same duty ratio, and wherein, in the second modulation mode, one of the serially-connected controllable switching devices in the second pair is turned continuously on and the other one of the serially-connected controllable switching devices in the second pair is turned continuously off.

2. The power converter of claim 1, wherein the serially-connected controllable switching devices in each pair are not closed at the same time.

3. The power converter of claim 1, wherein the controller is further configured to operate in a third modulation mode, in which the duty ratio of one of the serially-connected controllable switching devices in the second pair is increased over time and the duty ratio of the other serially-connected controllable switching device in the second pair is decreased over time.

4. The power converter of claim 3, wherein the controller operates in the third modulation mode between operating in the first modulation mode and operating in the second modulation mode.

5. The power converter of claim 3, wherein the controller operates in the third modulation mode between operating in the second modulation mode and operating in the first modulation mode.

6. The power converter of claim 1, wherein the controller selects which one of the first and second operating modulation modes to operate the power converter according to one or more of: power source voltage, load voltage, and load current.

7. The power converter of claim 1, wherein an external management controller directs the controller to select which one of the first and second modulation modes to operate the power converter.

8. The power converter of claim 1 wherein, in the first modulation mode, the controller operates the switching devices with at least one of: variable-switching frequency, constant-frequency pulse width modulation, and constant-frequency phase-shift control.

9. The power converter of claim 1 wherein, in the second modulation mode, the controller operates the switching devices with at least one of: variable switching frequency, constant-frequency pulse width modulation, and constant-frequency asymmetrical pulse width modulation control.

10. The power converter of claim 1, further comprising:
    an isolation transformer having a primary winding and a secondary winding coupled to the load through a rectifier stage, the isolation transformer having a leakage inductance and a magnetizing inductance;
    a primary-side capacitor coupled in series with the primary winding of the isolation transformer, wherein the series connection of the capacitor and the primary winding is coupled to the first and second pairs of the controllable switching devices; and
    a filter capacitor coupled to the rectifier stage and connected across at least one load.

11. The power converter of claim 10, wherein the power converter comprises a full-bridge converter operating under at least one of: constant-frequency pulse width modulation control and phase shift modulation control.

12. The power converter of claim 10, wherein the power converter comprises a resonant converter operating under at least one of: variable-frequency modulation control or constant-frequency phase shift modulation control.

13. The power converter of claim 10, wherein the power converter comprises an LLC resonant converter.

14. The power converter of claim 10, further comprising:
    a first inductor coupled in series with the primary-side capacitor to form a series resonant circuit; and
    a second inductor coupled in parallel with the primary winding of the isolation transformer.

15. The power converter of claim 10, wherein the rectifier stage comprises synchronous rectifiers.

16. The power converter of claim 1, wherein the power converter comprises an LLC resonant converter.

17. The power converter of claim 1, wherein the power converter comprises a power width modulated, full bridge converter.

18. The power converter of claim 1, wherein the power converter comprises a phase-shift, zero-voltage switching full bridge converter.

19. The power converter of claim 1, wherein the first modulation mode corresponds to a signal pattern for a full-bridge converter topology, and wherein the second modulation mode corresponds to a signal pattern for a forward or a forward-flyback converter topology.

* * * * *